(12) United States Patent
Qiao et al.

(10) Patent No.: US 8,514,568 B2
(45) Date of Patent: Aug. 20, 2013

(54) ELECTRONIC DEVICE HAVING ROTATABLE SUPPORT

(75) Inventors: Bin Qiao, Shenzhen (CN); Chuang-Lao Cheng, Shenzhen (CN); Feng Dai, Shenzhen (CN); Shou-Ji Liu, Shenzhen (CN); Te-Sheng Jan, Tu-Cheng (TW); Yu-Tao Chen, Tu-Cheng (TW); Chun-Che Yen, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 192 days.

(21) Appl. No.: 13/151,280

(22) Filed: Jun. 2, 2011

(65) Prior Publication Data

US 2012/0154995 A1     Jun. 21, 2012

(30) Foreign Application Priority Data

Dec. 20, 2010    (CN) .......................... 2010 1 0596183

(51) Int. Cl.
    *G06F 1/16*         (2006.01)
(52) U.S. Cl.
    USPC ...................... 361/679.59; 248/917; 248/919
(58) Field of Classification Search
    USPC ............ 361/679.01–679.45, 679.55–679.59;
                   248/917–919, 688; 348/836, 838, 843;
                   345/156, 157, 168, 169, 905; 312/223.1,
                   312/223.2
    See application file for complete search history.

(56) References Cited

U.S. PATENT DOCUMENTS

| 7,540,466 | B2 * | 6/2009 | Yang .............................. 248/688 |
| 7,864,262 | B2 * | 1/2011 | Chen et al. ...................... 349/58 |
| 8,074,956 | B2 * | 12/2011 | Wang et al. ................... 248/688 |
| 8,243,427 | B2 * | 8/2012 | Fu ............................ 361/679.21 |
| 8,243,428 | B2 * | 8/2012 | Fu ............................ 361/679.21 |
| 8,248,791 | B2 * | 8/2012 | Wang et al. ............. 361/679.59 |
| 2005/0269479 | A1 * | 12/2005 | Yeh et al. ...................... 248/457 |

FOREIGN PATENT DOCUMENTS

CN    201064002 Y    5/2008

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

An electronic device having a rotatable support is provided. A main body includes a first cylindrical engaging hole with a plurality of first internal gear teeth. A support body includes a second cylindrical engaging hole with a plurality of second internal gear teeth. A gear includes a first portion inserted in the first engaging hole and engaging with the first internal gear teeth, and a second portion inserted in the second engaging hole and engaging with the second internal gear teeth, to restrict the support body from rotating with respect to the main body. A spring member is compressed between the gear and main body in the first engaging hole, to urge the gear to move away from the main body. A button depressibly mounted on the support body is depressed to move the gear out of the second engaging hole, thereby disengaging the support body from the gear.

6 Claims, 5 Drawing Sheets

ELECTRONIC DEVICE HAVING ROTATABLE SUPPORT

BACKGROUND

1. Technical Field

The present disclosure relates to electronic devices with supports, and particular, to an electronic device having rotatable support.

2. Description of the Related Art

Electronic devices such as digital photo frames usually include a rotatably adjustable support. The support can be adjusted to support the electronic device at various orientations. Although the conventional supports can satisfy the basic requirement, it is always desirable and useful to provide a new support.

BRIEF DESCRIPTION OF THE DRAWINGS

The components in the drawings are not necessarily drawn to scale, the emphasis instead being placed upon clearly illustrating the principles of an electronic device having rotatable support. Moreover, in the drawings, like reference numerals designate corresponding parts throughout the several views.

DETAILED DESCRIPTION

Figure 1:
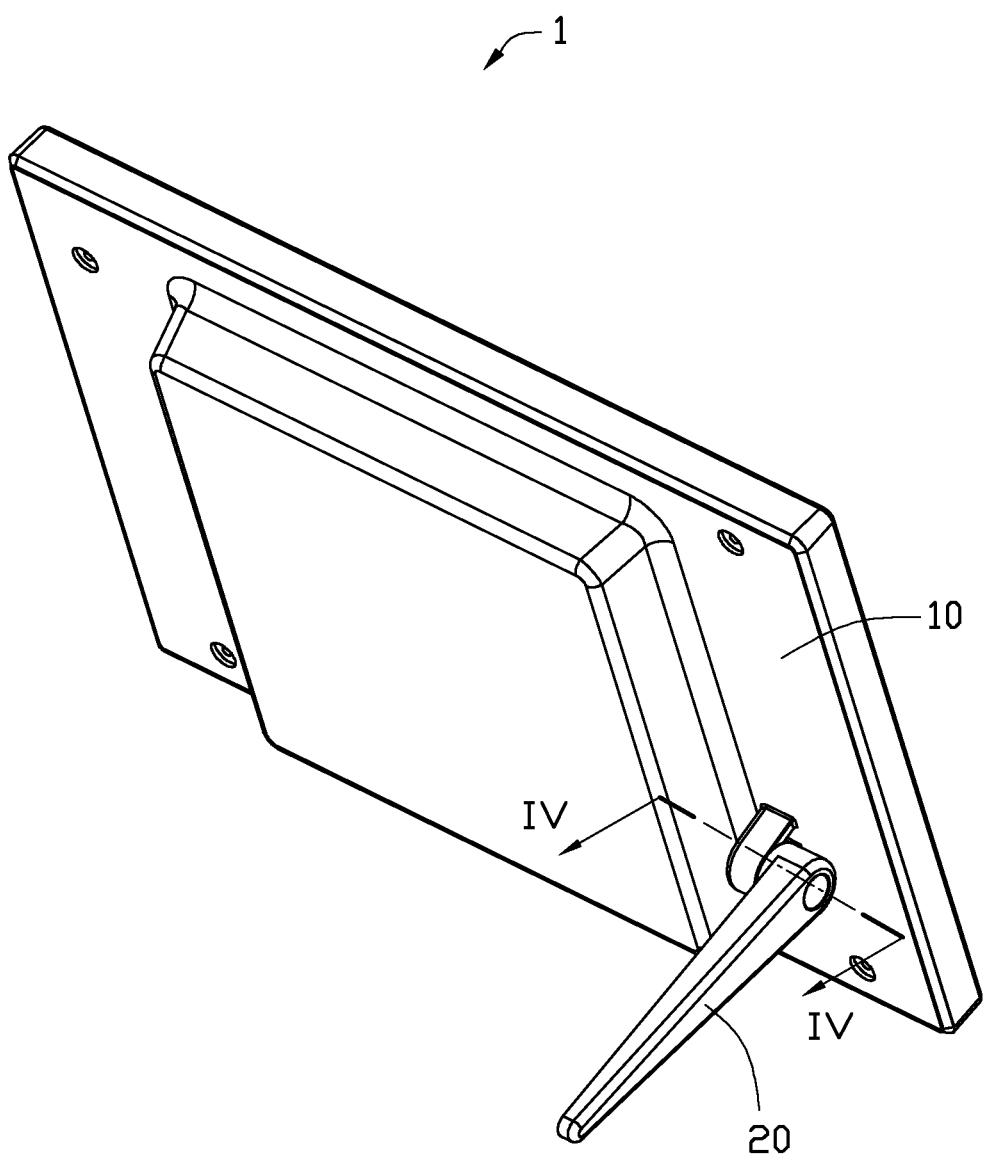
FIG. 1 is an isometric view of an electronic device in accordance with an exemplary embodiment.
Figure 2:
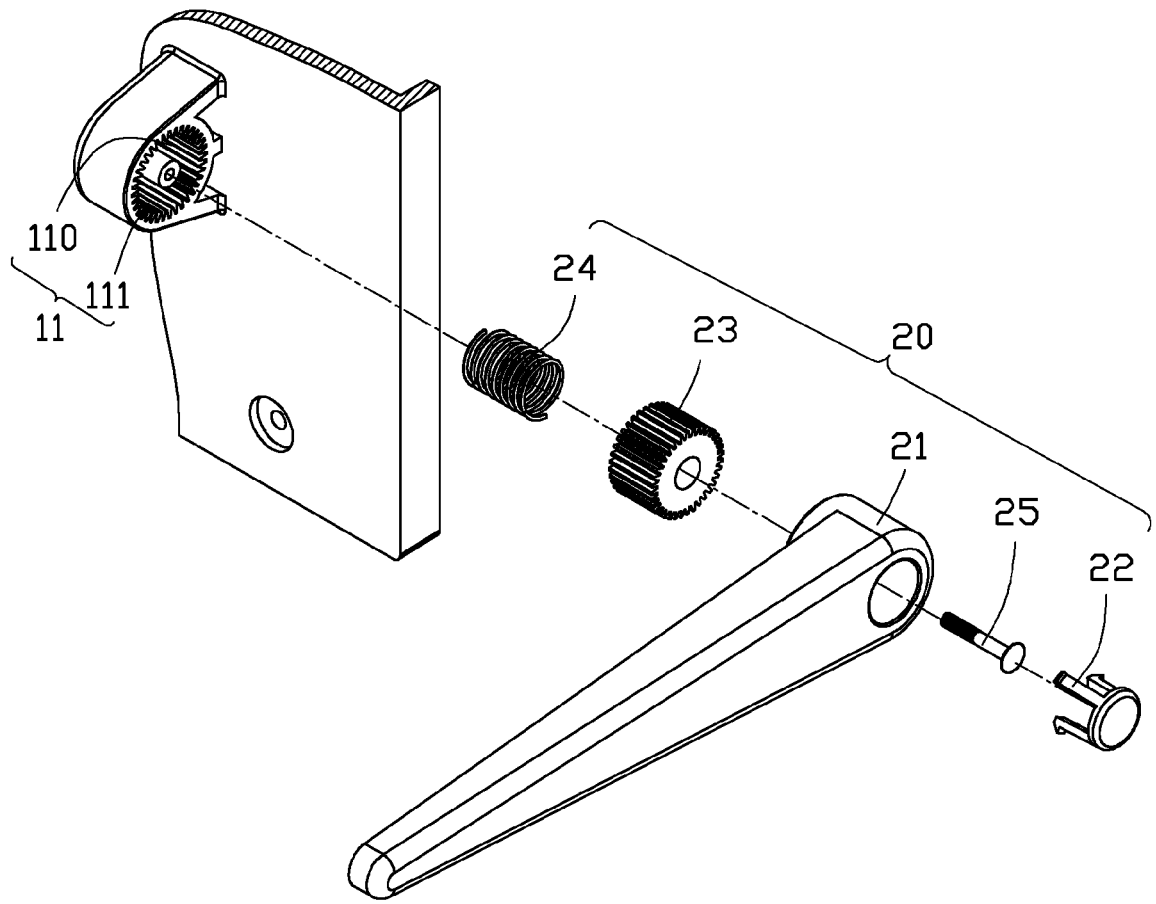
FIG. 2 is an isometric, exploded view of the electronic device in FIG. 1.
Figure 3:
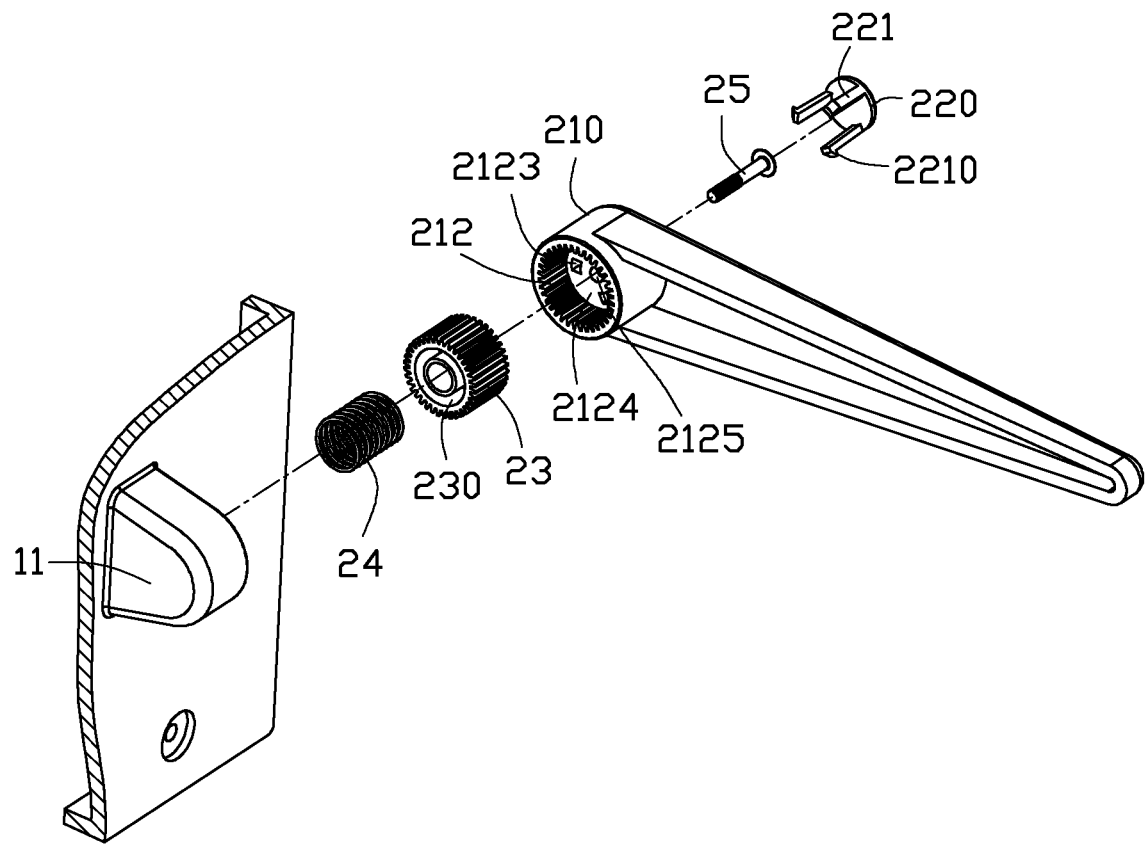
FIG. 3 is similar to FIG. 2, but viewed from another aspect.

Referring to FIGS. 1, 2, and 3, an electronic device 1 includes a main body 10 and a support 20 for supporting the main body 10. The main body 10 includes a first cylindrical engaging hole 11 to rotatably receive an end of the support 20.

The support 20 includes a support body 21, a button 22, a cylindrical gear 23, and a spring member 24. The support body 21 includes an upper end 210 with a second cylindrical engaging hole 2120 defined therein and a lower free end (not labeled). A central axis of the second cylindrical engaging hole 2120 is substantially perpendicular to a lengthwise direction of the support body 21.

Figure 4:
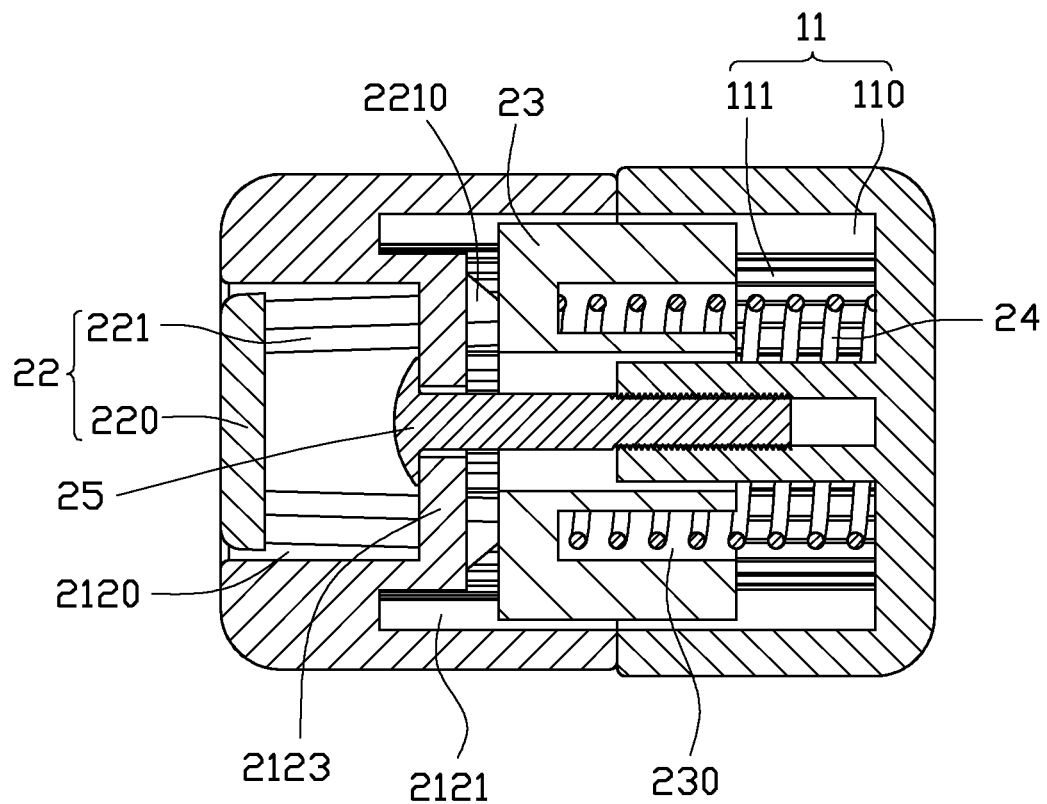
FIG. 4 is a cross-sectional view taken along the line IV-IV of FIG. 1, showing the support in a first, unrotatable position.

Referring to FIG. 4, the support body 21 further includes a third engaging hole 2121 opening toward a direction away from the second engaging hole 2120, and a bottom wall 2123 located between the second engaging hole 2120 and third engaging hole 2121. A plurality of second internal gear teeth 2122 are formed in the second engaging hole 2120, configured for engaging with the cylindrical gear 23. A through hole 2125 is defined in the wall 2123. A shank of a screw 25 passes through the through hole 2125 and is threadedly engaged with the main body 10 in the first cylindrical engaging hole 11, and a head of the screw 25 is received in the second engaging hole 2120 and abuts against the bottom wall 2123. The support body 21 is thus rotatably connected to the first cylindrical engaging hole 11.

The button 22 is slidably received in the second engaging hole 2120. The button 22 includes a button body 220, and a plurality of arms 221 protruding from the button body 220 and passing through the bottom wall 2123 for abutting against the gear 23. In the embodiment, a plurality of holes 2124 (shown in FIG. 3) are defined in the wall 2123, allowing the arms 221 to pass through. In the embodiment, there are three arms 221, and three corresponding holes 2124. Each of the arms 221 includes a free, barbed end 2210 at an opposite side of the bottom wall 2123 to the bottom body 220, thereby preventing the button 22 from disengaging from the support body 21.

Referring back to FIG. 2, the spring member 24 is received in the first engaging hole 11 and compressed between the gear 23 and the main body 10. The spring member 24 is configured to urge the gear 23 to move away from the main body 10. A plurality of first internal gear teeth 111 are formed on the lateral surface of the cavity 110, configured for engaging with the cylindrical gear 23. In the embodiment, a first annular groove 230 is defined in the gear 23, and a second annular groove 110 is defined in the first engaging hole 11. A portion of the spring member 24 is received in the first annular groove 230, and the rest portion is received in the second annular groove 110. Two ends of the spring member 23 abut, respectively, against the gear 23 and the first cylindrical engaging hole 11. In the embodiment, the elastic member 24 is a coil spring.

When the support 20 is connected to the main body 10, a portion of the cylindrical gear 23 is inserted in the first engaging hole 11 and engaged with the first internal gear teeth 111, and the rest of the cylindrical gear 23 is inserted in the second engaging hole 2120 and engaged with the second internal gear teeth 2122. In such situation, the support 20 is limited and cannot rotate with respect to the main body 20.

Figure 5:
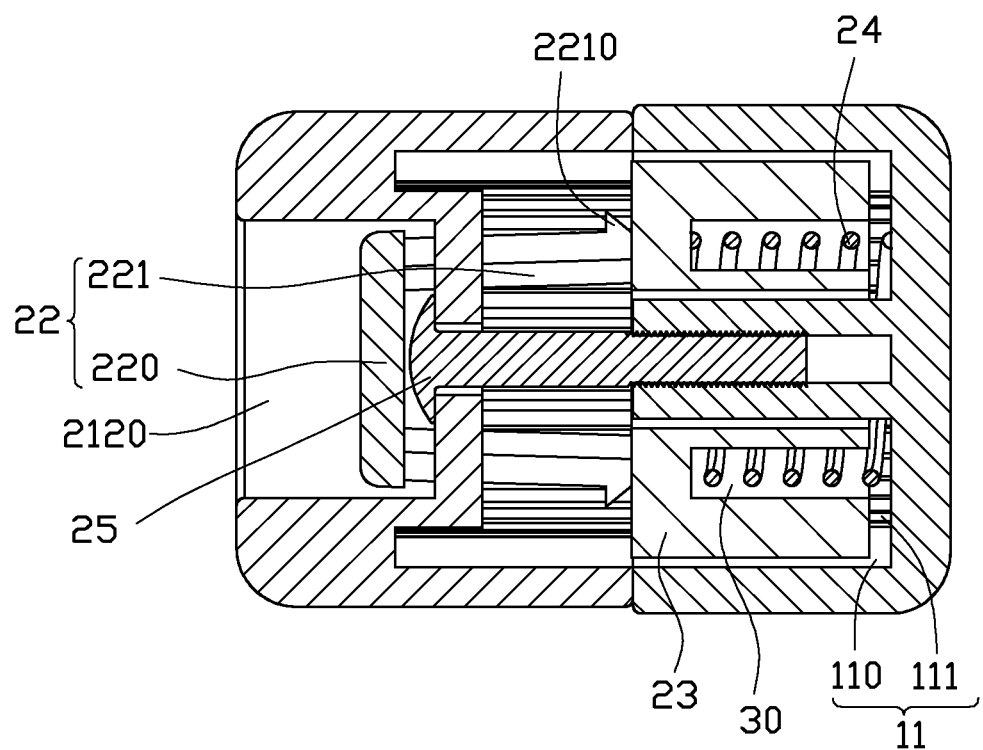
FIG. 5 is similar to FIG. 4, but showing the support in a second, rotatable position.

Referring to FIG. 5, when attempting to rotate the support 20, the button 22 is depressed to free the support 20 from the limitation. In one embodiment, while being pushed, the arms 221 slides in the holes 2124 and pushes the gear 23 out of the second engaging hole 2120, which compresses the spring member 24. The support body 21 can then freely rotate about the screw 25 to a proper position. Thus, the angle between the support 20 and the main body 10 can be adjusted. After releasing the button 22, the button 22 returns to its normal position due to the restoring force of the spring member 24. The gear 23 engages with the gear second internal teeth 2122 again, and the support body 21 is retained at the proper position.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
    a main body comprising a first cylindrical engaging hole and a plurality of first internal gear teeth formed in the first cylindrical engaging hole; and
    a support comprising:
        a support body comprising an upper end and a lower free end; a second cylindrical engaging hole defined in the upper end, a third engaging hole opening toward a direction away from the second engaging hole and a bottom wall located between the second and third engaging holes, a central axis of the second engaging hole being substantially perpendicular to a lengthwise direction of the support body; and the support body further comprising a plurality of second internal gear teeth formed in the second cylindrical engaging hole;
        a cylindrical gear inserted in the first engaging hole and engaging with the first internal gear teeth, and a second portion inserted in the second engaging hole and engaging with the second internal gear teeth, to restrict the support body from rotating with respect to the main body;

a spring member received in the first engaging hole and compressed between the gear and the main body, the spring member configured to urge the gear to move away from the main body; and a button depressibly mounted on the support body, and engaged in the third engaging hole, the button configured to be depressed to move the gear out of the second engaging hole, thereby disengaging the support body from the gear.

2. The electronic device as recited in claim 1, further comprising a screw including a shank passing through the bottom wall and threadedly engaged with main body in the first engaging hole, and a head received in the third engaging hole and abutting against the bottom wall.

3. The electronic device as recited in claim 1, wherein the button comprises:

a button body; and a plurality of arms protruding from the button body and passing through the bottom wall for abutting against the gear.

4. The electronic device as recited in claim 3, wherein each of the arms comprises a free, barbed end at an opposite side of the bottom wall to the button body, thereby preventing the button from disengaging from the support body.

5. The electronic device as recited in claim 1, wherein the spring member is a coil spring.

6. The electronic device as recited in claim 1, wherein an annular groove is defined in the gear, the spring member received in the groove.

\* \* \* \* \*